April 28, 1942.  R. B. FARNHAM  2,281,068
PLANT GROWING AND FEEDING POT
Filed Oct. 11, 1939
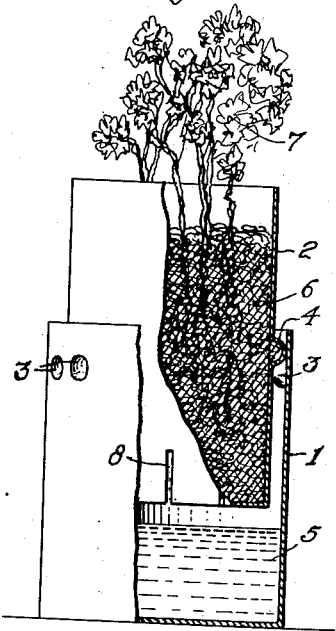
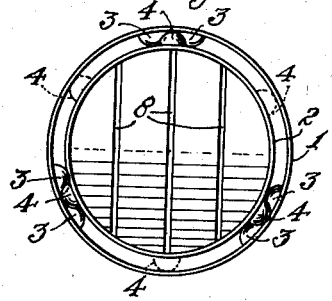
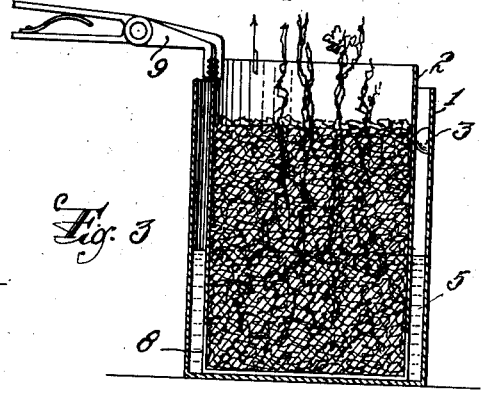
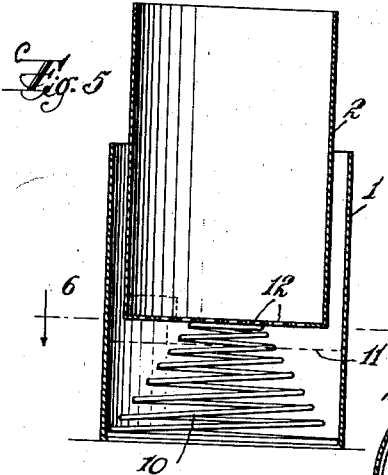
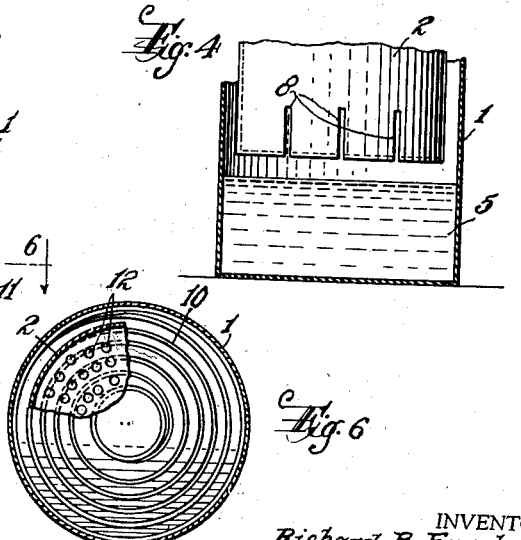
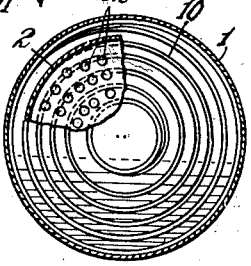
INVENTOR.
Richard B. Farnham
BY
A. D. T. Libby
ATTORNEY.

Patented Apr. 28, 1942

2,281,068

UNITED STATES PATENT OFFICE 2,281,068

PLANT-GROWING AND FEEDING POT

Richard B. Farnham, Cranbury, N. J., assignor to Endowment Foundation, New Brunswick, N. J., a corporation of New Jersey Application October 11, 1939, Serial No. 299,027

5 Claims. (Cl. 47—1.2)

This invention relates to a special type of plant-growing and feeding pot.

It has now become quite common, in raising plants in large greenhouses, to grow the plants in inert material in combination with a nutrient solution which is manually or automatically fed to the plants.

It is the object of my invention to provide means whereby the use of inert materials and nutrient solutions on growing plants in the home may be made available to the housewife, and to accomplish this primary object I have devised a plant-growing and feeding pot which is adapted to receive these inert materials and a nutrient solution. The ordinary plant pots used in the home, use what may be termed ordinary soil which becomes depleted as the mineral nutrients therein are gradually exhausted through withdrawal by the plant roots and through leaching from the pot at the time of watering. The ordinary home owner is usually lax in supplying the proper nutrients to the plants and in many cases uses the wrong amount and kind. Plants as ordinarily grown in the usual plant pots are poorly aerated and the roots do not get sufficient oxygen and gradually cease to function and decompose. While injury to the plants by the above-mentioned factors can be minimized by the operator, if the plant is intelligently cared for, yet this type of care involves the exercise of considerable judgment based on experience in the growing of plants.

The new plant pot to be herein described eliminates, to a large extent, the necessity of exercising judgment by the operator, by providing a pot adapted to use inert materials and a nutrient solution whereby abundant oxygen will be supplied to the roots at all times and adequate mineral nutrients and water are quickly and easily supplied to the plant.

My improved type of plant pot comprises two telescopically arranged receptacles illustrated in the annexed drawing wherein:

Figure 1 is a part-elevational and part-sectional view showing the pot with the two receptacles in what I term the normal position.

Figure 2 is a top plan view of the pot as shown in Figure 1, but without the plant and inert material.

Figure 3 is a sectional view of the structure of Figure 1, part of the plant being broken away and with the inner receptacle turned and lowered into the nutrient feeding position.

Figure 4 is a part-sectional and part-elevational view of the lower portion of the two receptacles shown in Figure 1.

Figure 5 is a sectional view of a modified arrangement of the two receptacles forming the complete pot.

Figure 6 is a view on the line 6—6 of Figure 5.

The pot is composed of an outer receptacle 1 and an inner receptacle 2. I prefer to make these receptacles of any suitable metal, such as aluminum, having considerable rigidity and tensile strength and which is resistant to corrosion by the nutrient solution used; or the receptacle may be coated at least internally by a corrosive-resistant material.

The outer receptacle 1, shown in Figures 1 to 3 inclusive, is provided with a plurality of indentations 3, three sets being illustrated in Figure 2 arcuately spaced 120°. The receptacle 2 is provided with a plurality of projections 4 which are adapted, as illustrated in Figures 1 and 2, to be positioned between the indentations 3, the proportions of these indentations and projections being such that the projections 4 will not pass downwardly between the indentations 3, the latter of which thereby serving to hold the receptacle 2 in elevated position as shown in Figure 1.

The receptacle 1 carries a suitable nutrient solution 5 which is composed of chemical salts so chosen as to provide sufficient quantities of all the necessary chemical plant nutrients in soluble form, the type of nutrient solution being adapted to the particular plant to be grown. The receptacle 2 carries an inert material 6 which is stable in physical and chemical form in the presence of the nutrient solution 5. This inert material is preferably light in weight and somewhat porous, certain grades of coke, charcoal, cinders or ashes, or certain grades of coarse sand being satisfactory, especially if neutralized and washed before being placed in the receptacle 2.

As shown in Figure 1 a plant 7 is indicated as being set into the receptacle 2 with its roots embedded in the inert material 6.

The bottom part of the receptacle 2 is provided with passageways shown in the form of slits 8 in Figures 1 and 2, to allow the nutrient solution to pass upwardly into the receptacle 2 and around the roots of the plant when the receptacle 2 is lowered into the receptacle 1 as shown in Figure 3. This lowering operation may be accomplished by taking hold of the receptacle 2 and raising it so the projections 4 are disengaged from the indentations 3 and moved to some position as indicated by dotted lines 4 in Figure 2, when the receptacle 2 may be lowered to the position indicated in Figure 3. As shown in Figure 3, the receptacle 2 is somewhat longer than the receptacle 1 so that it may be engaged by the hand of the operator or by a pair of pliers 9.

When the plant is in normal position as shown in Figure 1, the bottom of the receptacle 2 is preferably withdrawn a short distance out of the nutrient solution, the depth of which is such as to flood the nutrient solution around the roots of the plant when the receptacle is in the position of Figure 3, wherein no attempt is made to show the exact height of the solution in either container.

In Figures 5 and 6 I have indicated a resilient member in the form of a spirally wound spring 10 which acts to hold the receptacle 2, with the plant and nutrient solution, in the position so that the bottom thereof is above the level of the nutrient solution indicated by the broken line 11. In this case, the bottom of the receptacle 2 is provided with a plurality of perforations or holes 12. With this arrangement, all that is necessary in order to treat the plant is to press down on the top of the receptacle 2, thereby forcing the nutrient solution into it and around the plant roots, and on removing the pressure from the receptacle 2, it will automatically return to its normal position as indicated.

Ordinarily, all the housewife has to do with the use of a plant pot of the type herein shown and described, is to pass the receptacle 2 into the receptacle 1, probably once a day or more or less frequently as will be found desirable, depending on the type of plant being grown and the strength of the nutrient solution and other factors.

While I prefer to make the plant pot out of metal as heretofore set forth, it may be made of ceramic material, and the means for supporting the inner receptacle in normal growing position, as well as the means for passing it into the feeding position in the nutrient solution, may be varied considerably without departing from the spirit of my invention or the scope of the appended claims.

What I claim is:

1. A combined plant-growing and feeding pot comprising two telescopically arranged cup-like receptacles each having considerable depth compatible with usual plant pots, the inner receptacle containing the plant and rooting material, the lower part of this container having passageways therethrough, while the outer receptacle is adapted to contain a nutrient solution in amounts which will flood the roots of the plant in the inner receptacle, and means comprising cooperative formations on the two receptacles for normally holding the inner one out of the outer receptacle at least in part and out of the nutrient solution, the receptacles being relatively movable to allow the inner receptacle to be moved downwardly a considerable distance into the nutrient solution within the outer receptacle.

2. A combined plant-growing and feeding pot comprising two telescopically arranged cup-like receptacles, the inner receptacle containing the plant and rooting material, the lower part of this container having passageways therethrough, while the outer receptacle is adapted to contain a nutrient solution, and means comprising a spring positioned within the outer receptacle and on which the inner receptacle rests for normally holding the inner receptacle out of the nutrient solution, the inner receptacle adapted to be depressed against the spring into the nutrient solution substantially as described.

3. A combined plant-growing and feeding pot prising two metal cup-shaped receptacles fitting freely one within the other, the inner receptacle adapted to carry the plant and an inert material and having its bottom part perforated in several places to allow a nutrient solution, carried in the outer receptacle, to pass therethrough, means for normally holding the inner receptacle in position so the inert material therein is out of the nutrient solution, the inner receptacle being movable downwardly by a force against said means into the nutrient solution in the outer receptacle, said means acting to restore the inner receptacle to normal position after the said downwardly acting force is removed.

4. A combined plant-growing and feeding pot comprising two metal cup-shaped receptacles of considerable depth and fitting freely one within the other, the inner receptacle being longer than the outer and adapted to carry the plant and an inert material and having its bottom part perforated in several places to allow a nutrient solution, carried in the outer receptacle in amounts which will flood the roots of the plant in the inner receptacle, to pass quickly therethrough, and manually operative interlocking means for normally holding the inner receptacle in a position so the inert material therein is out of the nutrient solution, the said inner receptacle being movable to release the interlocking means so this receptacle can be lowered into the nutrient solution which is of a depth to flood the plant roots even though they do not reach the bottom of the inner receptacle.

5. A combined plant-growing and feeding pot especially for household use, comprising two telescopically arranged cup-like receptacles, each having considerable depth comparable with usual plant pots, the inner receptacle containing the plant and rooting material, the lower part of this receptacle having passageways therethrough, while the outer receptacle is adapted to contain a nutrient solution in amount which will flood the roots of the plant in the inner receptacle when the same is moved thereinto, and coacting means between the two receptacles for normally holding the inner receptacle so at least the plant roots therein are out of the nutrient solution, said means being actuatable, by force applied to the top part of the inner receptacle, to move it into the nutrient solution within the outer receptacle.

RICHARD B. FARNHAM.